US006944878B1

(12) United States Patent
Wetzel et al.

(10) Patent No.: US 6,944,878 B1

(45) Date of Patent: Sep. 13, 2005

(54) METHOD AND APPARATUS FOR SELECTING A SATELLITE SIGNAL

(75) Inventors: Daniel Thomas Wetzel, Marion, IN (US); Terry Wayne Lockridge, Hamilton, IN (US); Michael F. Barry, Hamilton, IN (US)

(73) Assignee: Thomson Licensing S.A., Boulogne-Billancourt (FR)

( * ) Notice: Subject to any disclaimer, the term of this patent is extended or adjusted under 35 U.S.C. 154(b) by 0 days.

(21) Appl. No.: 09/475,444

(22) Filed: Dec. 30, 1999

Related U.S. Application Data

(60) Provisional application No. 60/144,456, filed on Jul. 19, 1999.

(51) Int. Cl.[7] ................................................ H04N 7/20

(52) U.S. Cl. ............................ 725/72; 725/63; 725/64; 725/68; 725/69; 725/70; 455/427; 455/12.1; 455/13.3

(58) Field of Search ............................. 725/63–70, 72; 455/427, 12.1, 13.3

(56) References Cited

U.S. PATENT DOCUMENTS

| | | | | | |
|---|---|---|---|---|---|
| 4,509,198 | A | * | 4/1985 | Nagatomi | 725/68 |
| 4,608,710 | A | * | 8/1986 | Sugiura | 725/68 |
| 4,876,736 | A | * | 10/1989 | Kiewit | 725/14 |
| 4,959,873 | A | * | 9/1990 | Flynn et al. | 455/303 |
| 5,263,182 | A | | 11/1993 | Park | 455/188.1 |
| 5,283,639 | A | * | 2/1994 | Esch et al. | 725/32 |
| 5,303,403 | A | * | 4/1994 | Leong | 455/192.3 |
| 5,424,750 | A | | 6/1995 | Akisada | 342/359 |
| 5,534,941 | A | | 7/1996 | Sie et al. | 348/564 |
| 5,708,963 | A | | 1/1998 | Mobley et al. | 455/12.1 |
| 5,737,363 | A | | 4/1998 | Dinkins | 375/219 |
| 5,751,247 | A | | 5/1998 | Nomoto et al. | 342/359 |
| 5,764,186 | A | | 6/1998 | Yoo | 342/359 |
| 5,828,945 | A | | 10/1998 | Klosterman | 455/4.2 |
| 5,886,995 | A | | 3/1999 | Arsenault et al. | 370/477 |
| 5,898,455 | A | | 4/1999 | Barakat et al. | 348/6 |
| 5,923,362 | A | | 7/1999 | Klosterman | 348/12 |
| 5,940,737 | A | * | 8/1999 | Eastman | 725/68 |
| 5,983,071 | A | * | 11/1999 | Gagnon et al. | 725/72 |
| 6,029,044 | A | * | 2/2000 | Arsenault et al. | 725/68 |
| 6,128,352 | A | * | 10/2000 | Maeda | 375/316 |
| 6,310,661 | B1 | * | 10/2001 | Arsenault | 348/725 |
| 6,430,165 | B1 | * | 8/2002 | Arsenault | 370/316 |

FOREIGN PATENT DOCUMENTS

| | | |
|---|---|---|
| DE | 29818825 | 6/1999 |
| GB | 2319129 | 5/1998 |

* cited by examiner

*Primary Examiner*—John Miller
*Assistant Examiner*—John Manning
(74) *Attorney, Agent, or Firm*—Joseph S. Tripoli; Robert D. Shedd; Brian J. Cromarty

(57) ABSTRACT

A method and apparatus for ensuring a correct satellite signal connection. Specifically, a user selects a satellite signal via an integrated receiver/decoder (IRD) from at least one satellite, and the IRD sends a command signal to a selector switch to acquire and lock onto said satellite signal. The IRD repeats transmission of the command signal to the selector switch once the IRD has acquired and locked onto said information signal. Thus, in the event that the selector switch failed to switch to a low noise block converter (LNB) corresponding to the initial command signal, then the repeated command signal helps to ensure that the selector switch switches to the LNB corresponding with the latest command signal sent by the IRD.

13 Claims, 4 Drawing Sheets

METHOD AND APPARATUS FOR SELECTING A SATELLITE SIGNAL

CROSS-REFERENCE TO RELATED APPLICATIONS

This application claims benefit of U.S. Provisional application No. 60/144,456, filed Jul. 19, 1999.

BACKGROUND OF THE INVENTION

1. Field of Invention

The present invention relates to a Direct Broadcast Satellite (DBS) system. More particularly, the invention relates to a method and apparatus for selecting one of a plurality of information signals broadcast from at least one satellite in the Direct Broadcast Satellite (DBS) system.

2. Description of the Background Art

Direct Broadcast Satellite (DBS) content providers have chosen to use multiple satellite networks to distribute their signals. In the past, a Low Noise Block converter (LNB) supply voltage (+13V/+18V) has been used to select between the two polarities of signals that were available on a single satellite network. Additionally, if signals from only two satellites are available for reception, then the presence or absence of a 22 kHz tone superimposed on the LNB supply voltage may be used to switch between either of the two satellite networks.

When the number of satellite networks grows beyond two, the voltage, and tone switching combination is no longer sufficient. One method to overcome this impediment is through bi-directional communications between an integrated receiver/decoder (IRD) and a satellite selector switch, such as used in the European standard known as DISEQ. The IRD sends a command signal to the selector switch to switch to a selected satellite network. The two-way (directional) protocol provides an avenue for feedback from the switch to the IRD. Thus, in an instance where the IRD sends a command to the selector switch, the selector switch upon switching, sends an acknowledgement message back to the IRD.

However, not all satellite systems utilize bi-directional protocols, rather many utilize unidirectional messaging. The problem encountered by an integrated receiver/decoder (IRD) using a unidirectional messaging system is that the IRD has no feedback from the switch. Thus, a message may be sent to the switch, nevertheless, the IRD has no way of knowing whether or not the switch actually received the message and then switched.

The lack of feedback may cause a problem if the user disconnects and reconnects the transmission coaxial cable, for example, in an attempt to reset the IRD and switch. The IRD will search for the lost satellite signal throughout each of the satellite networks by attempting to send messages to the switch, even though the switch is not connected to the IRD. When the user reconnects the switch via the coaxial cable, the switch will default to the prior transponder, which is not necessarily the transponder the IRD was expecting to switch to. Thus, the user will receive the wrong satellite signal.

Furthermore, the lack of feedback from the switch may cause a problem when the IRD sends a command signal that is degraded or incomplete (e.g., coaxial cable signal losses). In this instance, the switch may fail to properly select the correct transponder on a satellite or the correct satellite thereby sending the user an incorrect satellite signal.

Therefore, it is desirable to provide a method and apparatus for ensuring proper satellite network and transponder selection via the IRD and switch. It is also desirable to provide a form of feedback from the switch to indicate that the switch has failed to properly select a desired satellite signal.

SUMMARY OF INVENTION

The disadvantages heretofore associated with the prior art, are overcome by the present invention of a method and apparatus for selecting a specific satellite signal. Specifically, a user selects a satellite signal via an integrated receiver/decoder (IRD), from at least one satellite network. The IRD sends a command signal to a selector switch to switch to one of a plurality of low noise block converters (LNB) coupled to a satellite collector dish.

The command signal is transmitted from the IRD whenever the integrated receiver/decoder has not locked on to the satellite signal. Once the IRD acquires the satellite signal, the IRD repeats the transmission of the command signal to the selector switch. Thus, in the event that the selector switch failed to switch to the LNB corresponding to the initial command signal, then the repeated command signal helps to ensure that the selector switch switches to the LNB corresponding with the latest command signal sent by the IRD.

BRIEF DESCRIPTION OF THE DRAWINGS

The teachings of the present invention can be readily understood by considering the following detailed description in conjunction with the accompanying drawings, in which.

DETAILED DESCRIPTION OF THE INVENTION

Figure 1:
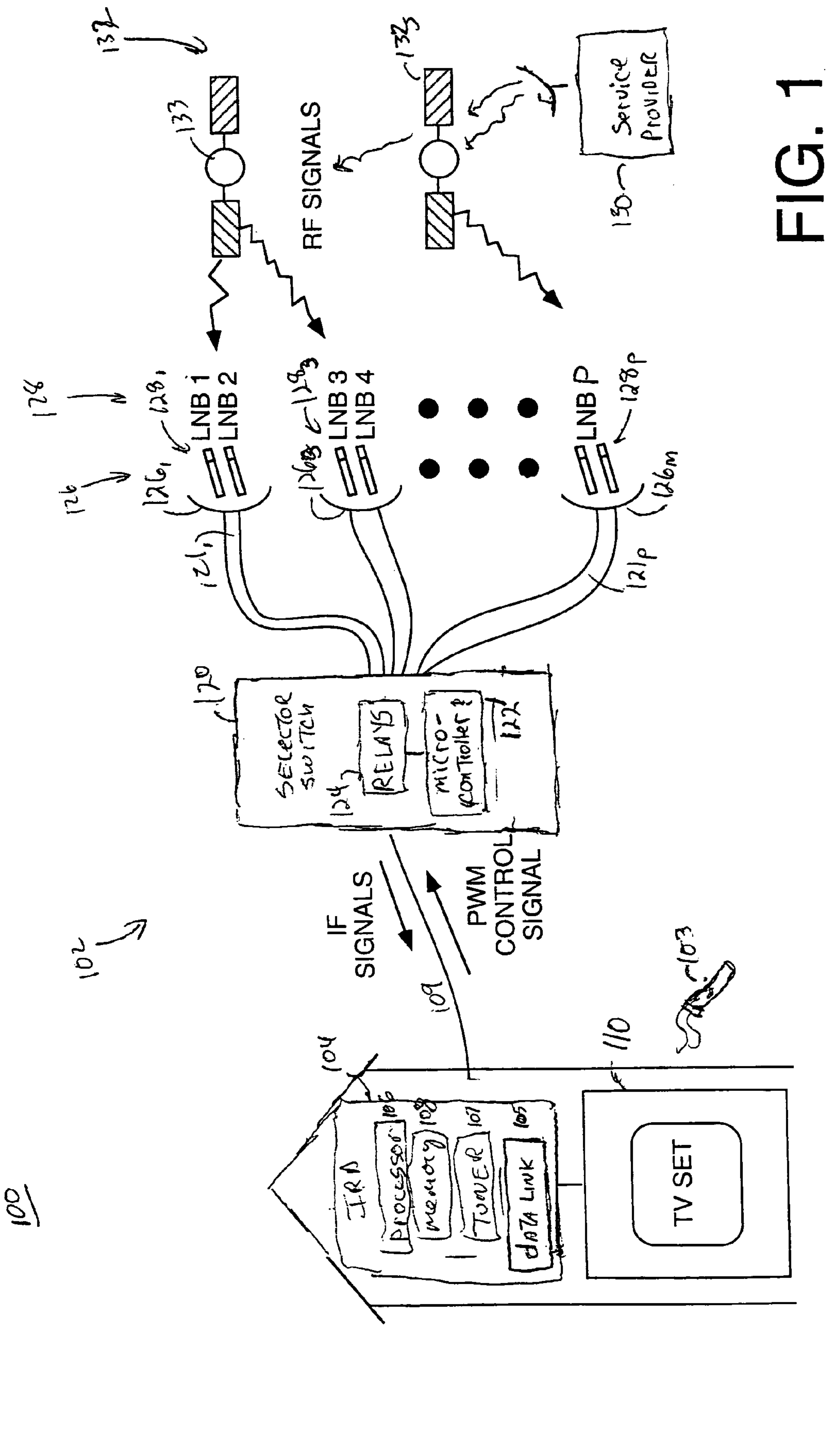
FIG. 1 depicts a block diagram of a Direct Broadcast Satellite System.

FIG. 1 depicts a block diagram of a direct broadcast satellite communications system 100. The direct broadcast satellite (DBS) system 100 comprises a service provider 130 from which audio, video, and/or data may be (hereinafter "satellite signal") uplinked to a satellite network comprising at least one satellite network 132. Each satellite network 132 includes a satellite 133 having a plurality of transponders for downlinking the satellite signal to a plurality of subscriber equipment 102 having satellite signal receiving capabilities. Subscriber equipment 102 for a single location is depicted in FIG. 1.

Specifically, a DBS service provider 130 provides hundreds of television channels including a program guide from which a subscriber may choose programming. The subscriber may select any channel via an input device 103 such as a remote control, for tuning an integrated receiver/decoder (IRD) 104 to the carrier frequency of the selected satellite signal. The direct broadcast satellite system 100, in conjunction with a method of requesting a satellite signal by a subscriber, as will be described in more detail hereinafter, advantageously ensures that the correct satellite signal is selected and coupled to the IRD 104.

In particular, the subscriber equipment 102 comprises the IRD 104 having a processor 106, a tuner 107, memory 108, and a datalink 105. The datalink 105 is utilized in a digital IRD 104. In general, the tuner 107 tunes to a desired transponder frequency and down-converts that frequency to a baseband signal (e.g., approaching zero cycles/sec.) The baseband signals are sent to the datalink 105 where the baseband signals are converted from an analog to digital data format. The digital data is then sent to the memory 107 and processor 106 for storage and further processing, respectfully.

The IRD 104 is coupled to a selector switch 120, via a signal path 109 such as a coaxial cable or a common transmission line. The selector switch 120 comprises a controller 122 such as a microcontroller, and a plurality of switching devices 124 such as relays. Upon sending a subscriber request for information, the processor 106 of the IRD 104 sends a command signal (e.g., 22 kHz tone) via the coaxial cable 109, to the microcontroller 122 of the selector switch 120.

The selector switch 120 is at coupled to at least one collector dish 126, through 126$_m$ (collectively, collector dishes 126). Each collector dish 126 has at least one low noise block (LNB) converter 128$_l$ through 128$_p$ (collectively LNB 128) coupled to the collector dish 126 via a feedhorn (not shown). For example, an elliptical collector dish 126 may have three LNBs 128 coupled to a single feedhorn, wherein each LNB is capable of receiving signals from three distinct satellite networks 132.

Specifically, each relay 124 of the selector switch 120 is correspondingly coupled to at least one low noise block (LNB) converter 128 via at least one signal path 121$_l$ through 121$_p$ (collectively signal paths 121). Each low noise block converter (LNB) is capable of selectively receiving the radiated signals from one of the satellite networks 132 and down-converting the satellite signal to an intermediate frequency (IF) signal. Thereafter, the IF signals travel via the signal path 121, through the selector switch 120 and to the IRD 104.

Satellites radiate microwave signal beams in various bandwidths having a range of frequencies such as the C-band (i.e., 3.7 to 6.425 GHz) and Ku-band (i.e., 10.7 to 18.1 GHz). Satellite television signals are polarized. This property of the satellite signals is used to improve spectrum efficiency in the satellite frequency bands. Two different types of polarization (i.e., the orientation of the electric field distal from the antenna) have been employed in satellite television applications.

Linear polarization has two alternate states, i.e., horizontal and vertical polarization (HP and VP). Similarly circular polarization has two alternate states, i.e., left hand, and right hand circular polarization (LHCP and RHCP). The IRD 104 is capable of determining the type of polarization for the satellite signal selected by a user. The IRD 104 then sends a 13 volt or 18 volt signal as part of the command signal to the LNB 128 to enable the LNB 128 to differentiate between the polarization states i.e., the LHCP and RHCP, or the HP and VP.

The IRD 104 may send as the command signal a 22 KHz tone to the selector switch 120, where the presence or absence of the tone is used to switch between two satellites. In an instance where more than two satellite networks exist, the command signal will provide a message containing the orbital slot pertaining to the selected satellite.

Accordingly, when the collector dish 126 receives the radiated signal from the satellite, the LNB 128 corresponding to the command signal sent by the IRD 104 is able to select and amplify the incoming polarized satellite signal to a level that can be demodulated by the IRD 104. Furthermore, the LNB 128 down-converts the incoming satellite signal to an intermediate frequency (IF), illustratively, from a 12 GHz range down to 1 to 2 GHz. The down-conversion is performed by the LNB 128 in order to minimize high cable loses, typically occurring at 4 and 12 GHz.

The IRD 104 locks onto the selected satellite signal, and the selected satellite signal is down-converted to the specific frequency pertaining to the program channel selected by the user. Thereafter, the satellite signal is demodulated and decoded into the audio, video, and/or data signal components. The audio, video, and/or data signal components are then sent to a subscriber output device 108 such as a television set, recorder, computer, or other processing or recording device.

Figure 2A:
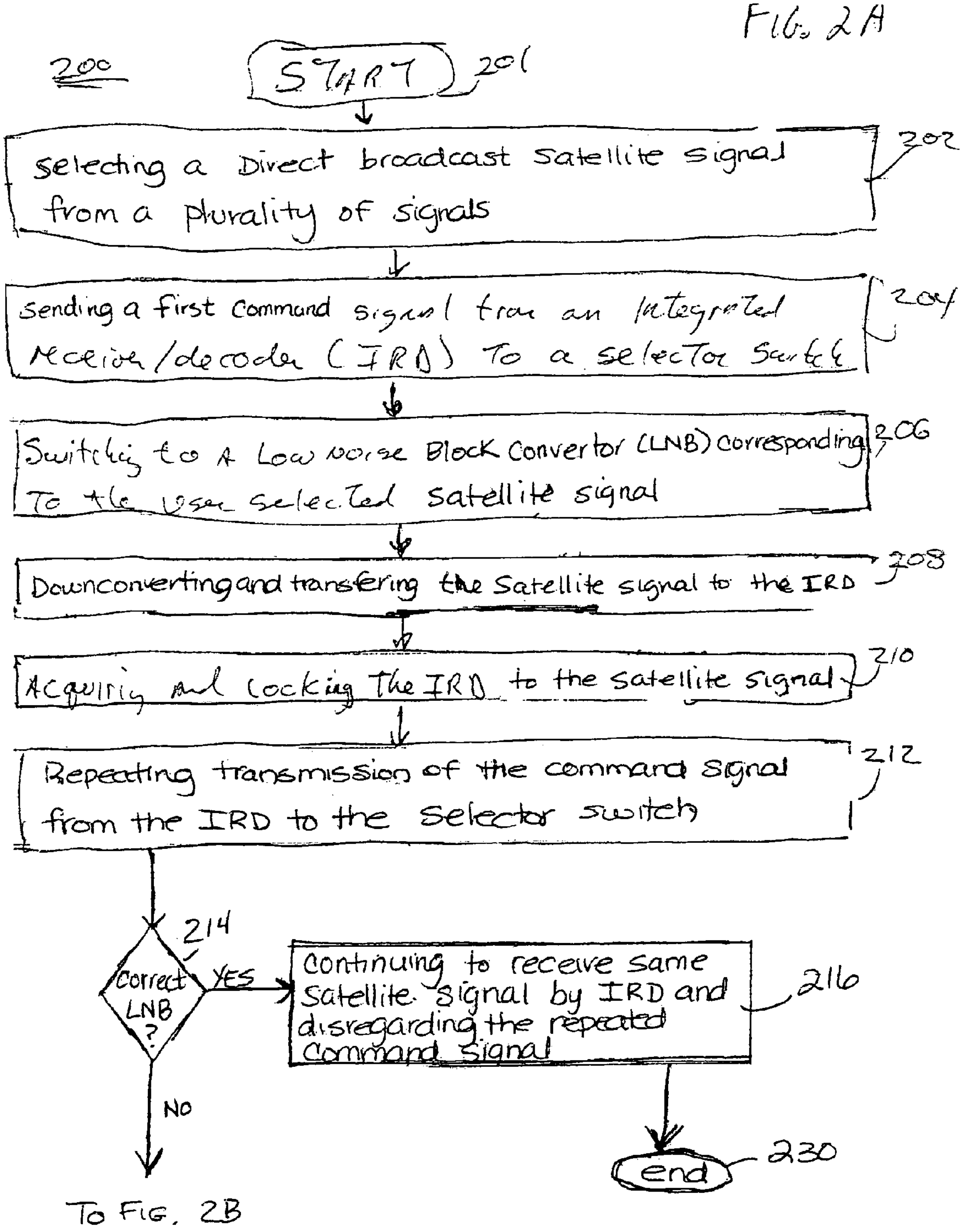
FIGS. 2A and 2B depict a flow diagram of a method for selecting a broadcasted satellite signal from a satellite network.
Figure 2B:
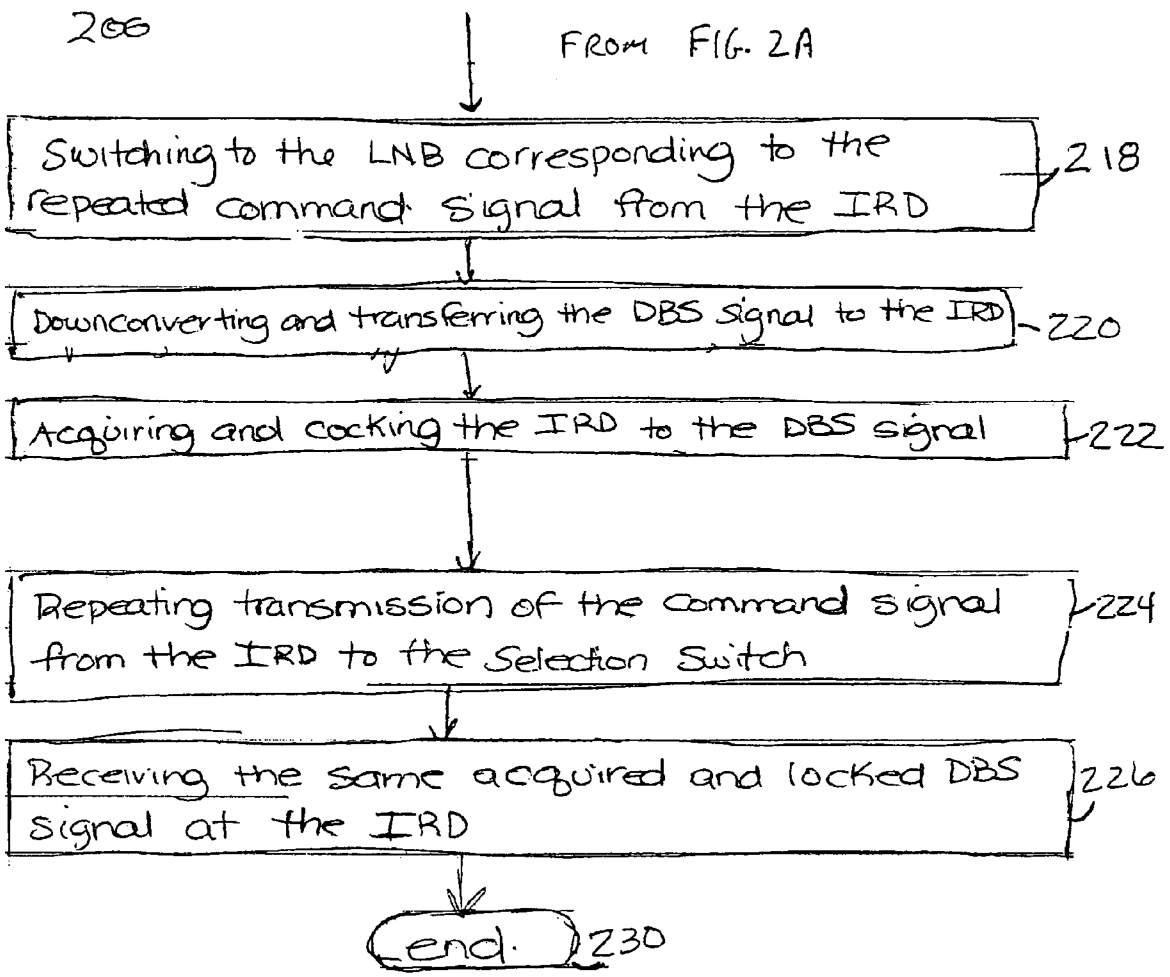

FIGS. 2A and 2B depict a flow diagram of a method for selecting a broadcasted satellite signal from a satellite network. The method 200 starts at step 201 and proceeds to step 202 where a subscriber makes a request for information by selecting an information channel from their remote control device.

In step 204, an integrated receiver/decoder (IRD) receives the subscriber request and a processor of the IRD sends a command signal, such as a 22 KHz pulse width modulation tone, over a coaxial cable coupled to a selector switch having a microcontroller. The microcontroller of the selector switch decodes the command signal from the IRD to identify a signal path required to receive the satellite signal selected by the user.

In step 206, the microcontroller activates a relay in the selector switch to couple the IRD to a corresponding satellite signal collector dish having a low noise block converter (LNB). The corresponding LNB allows the collector dish to focus and downlink the radiated satellite signals from the service provider's satellite to the receiving elements of the selected LNB.

In step 208, the selected satellite signal is down-converted by the LNB to an intermediate frequency and then transferred through the selector switch and coaxial cable to the IRD. In step 210, the IRD acquires and locks on to the down-converted satellite signal and then the method 200 proceeds to step 212.

In step 212, the IRD repeats the transmission of the command signal to the selector switch. The repeated command signal is provided to ensure that the selector switch is not set to an LNB corresponding to a different transponder or satellite network carrying a satellite signal not requested by the IRD.

In step 214, if the selector switch is correctly coupled to the appropriate LNB to receive the selected satellite signal during the initial command signal (i.e., step 204), then the method 200 proceeds to step 216. In step 216, the repeated command signal is disregarded without consequence and the IRD continues to receive the same satellite signal without interruption. Thus the subscriber will receive the requested satellite signal as per the initial command signal sent by the IRD, without interference from the repeated command signal. The method 200 then proceeds to step 230 and ends.

Conversely, the selector switch may appear to be set to the wrong LNB from the perspective of the IRD. Such situation may occur when the IRD has lost the locked satellite signal.

When the satellite signal is lost, i.e., "unlocked", then the IRD sends out consecutive command signals to the selector switch in order to search for the lost satellite signal. The command signals are sent to the selector switch to switch amongst the LNBs until a satellite signal is received by the IRD. The unlocking of the satellite signal may occur due to noise in the system, such as degradation of the signal on the coaxial cable, or a disruption in the connection between the IRD and switch, illustratively caused by a user disconnecting the coaxial cable temporarily to reset the IRD and switch, or otherwise.

For example, if a user has been viewing a selected broadcast satellite channel and then disconnects the coaxial cable, the IRD will stop receiving the locked satellite signal. The IRD will then begin searching for the lost signal from the service provider. The search is performed by the IRD across the satellite network, which may include switching the LNBs between satellites if more than one satellite network exists.

Every time the IRD sends a command signal to the selector switch during the search, the IRD will assume the selector switch has switched according to the IRD's commands. However, the user, illustratively, has disconnected the coaxial cable in this instance, and therefore the IRD and selector switch are no longer coupled. Since the communications between IRD and switch is unidirectional, the IRD does not have any means to receive direct feedback from the selector switch after issuing a command signal. Therefore, the IRD mistakenly thinks the selector switch has responded to its commands, when in fact the selector switch has never received the command signals.

When the user reconnects the coaxial cable, the IRD will acquire the satellite signal of which the IRD was originally tuned and locked upon via the LNB. Notwithstanding, the tuner of the IRD will be set to a different channel since the IRD has been searching throughout the satellite network for a signal. Thus, this newly acquired signal received by the IRD is deemed the wrong signal by the IRD.

Therefore in step 214, if the selector switch is not correctly coupled to the appropriate LNB to receive the selected DBS signal, then in step 218, the repeated command sent signal by the IRD to the selector switch changes the selector switch setting to the correct LNB. In particular, the selector switch then activates the relay coupled to the LNB corresponding to the last command signal the IRD sent out during its search for the satellite signal. When the selector switch switches to the (correct) LNB corresponding to the repeated (latest) IRD command signal, the previous (incorrect) satellite signal is unlocked from the IRD.

The method 200 then proceeds to step 220, where the LNB receives, down-converts, and transfers the correct satellite signal to the IRD. In step 222, the IRD again acquires and locks upon the incoming satellite signal.

Once the IRD locks onto the satellite signal, in step 224, the processor of the IRD sends a repeated command signal to the selector switch. The repeated command signal is sent since, in step 218, the IRD had become unlocked from the previous satellite signal and thereafter performed a signal search. Then, in step 226, the repeated command signal of step 222 is ignored and the IRD continues to receive and lock onto the same satellite signal without consequence.

Henceforth, there is no further interaction between the IRD and the selector switch since the two devices have correctly selected the appropriate LNB to receive the selected satellite signal during the previous command signal in steps 218 through 222. Thus the selector switch and LNB correlate with the command signal sent by the IRD.

In this manner, the method 200 is designed to send a command signal whenever the tuner of an IRD is not locked onto a satellite signal. Furthermore, whenever the tuner of an IRD does lock onto a newly acquired satellite signal, a repeated command signal is sent to the selector switch to ensure that the selector switch has selected and coupled to the appropriate LNB. The method 200 then proceeds to step 230, where it ends until a user either selects another satellite channel or the IRD becomes unlocked from the satellite signal for some other reason such as discussed herein.

Figure 3:
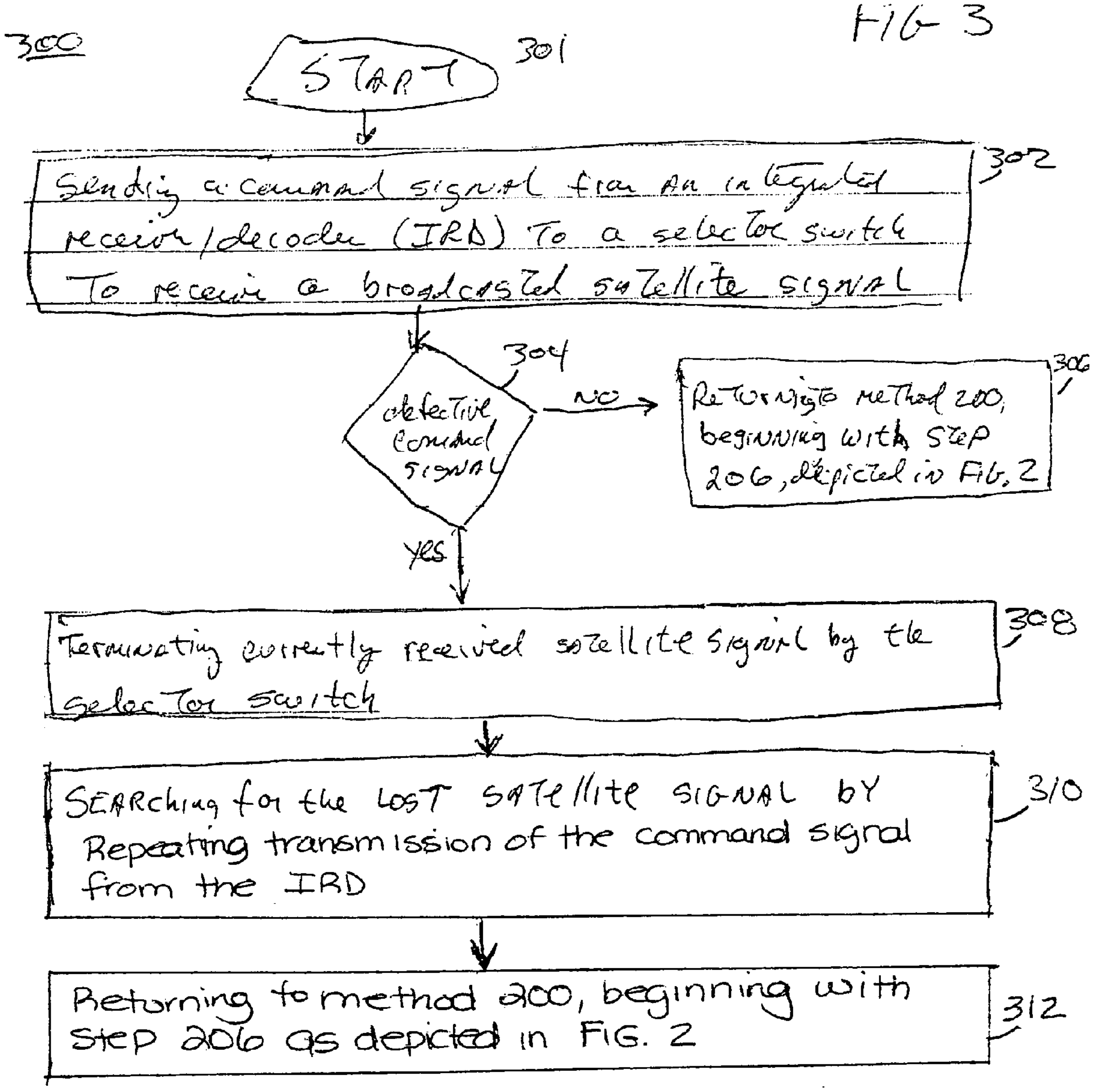
FIG. 3 depicts a flow diagram of a method for providing feedback to an integrated receiver/decoder from a device coupled via a unidirectional signal path.

In an instance where there is degradation in the command signal sent by the IRD, then a second inventive method provides a means of feedback to the IRD to take specific recourse. FIG. 3 depicts a flow diagram of a method for providing feedback to an integrated receiver decoder (IRD) from a device coupled via a unidirectional signal path. Specifically, method 300 provides feedback to an IRD in an instance where a command signal from the IRD to a selector switch is degraded or incomplete.

The method 300 starts at step 301, and proceeds to step 302 where the IRD sends a command signal to the selector switch to couple a low noise block converter LNB to the IRD to receive a satellite signal from a satellite network, as selected by a user.

In step 304, if the command signal is without degradation, then the method 300 proceeds to step 306. In step 306, the method 300 proceeds to method 200, beginning at step 206 as depicted in FIG. 2.

Alternatively, if, in step 304, the command signal is incomplete or degraded to the point that a microcontroller of the selector switch cannot determine which LNB is to be coupled to the IRD, then the method proceeds to step 308. In step 308, the microcontroller terminates the satellite signal it is currently receiving. In this instance, the microcontroller deactivates or disconnects the active relay receiving the satellite signal. Thus, the satellite signal being broadcast from the satellite and received by the LNB is cut off at the selector switch, resulting in the IRD becoming unlocked from the satellite signal.

In step 310, the IRD begins to search for the lost satellite signal. The search by the IRD is performed by repeating the command signal it previously sent to the selector switch. Thereafter, the method 300 proceeds to step 312 where the method 300 returns to method 200, beginning at step 206 as depicted in FIG. 2.

In this manner, the method provides feedback to the IRD whenever the command signal sent by the IRD is degraded beyond the microprocessor of the selector switch's ability to determine which LNB is required to satisfy the command signal sent by the IRD. Thus, when the microprocessor terminates the currently received satellite signal, that act provides feedback to the IRD to let the IRD know that the command signal the IRD just sent was defective. Moreover, the IRD will know that the selector switch did not respond to IRD's command, and a repeated command signal must be issued.

It should be apparent to those skilled in the art that a novel method for ensuring a correct satellite signal is being received by a tuner of an integrated receiver/decoder (IRD) has been provided. In one embodiment, a method inventively repeats the command signal sent to the selector switch to couple the IRD with an LNB corresponding to the broadcast channel selected by a user, thereby providing redundancy. Additionally, in another embodiment, a method provides feedback to the IRD from the selector switch to force the IRD to send a repeated command signal in an instance that a prior command signal sent by the IRD was defective.

Although various embodiments that incorporate the teachings of the present invention have been shown and described in detail herein, those skilled in the art can readily devise many other varied embodiments that still incorporate these teachings.

What is claimed is:

1. A method of selecting a satellite signal comprising the steps of:

selecting said satellite signal via an integrated receiver/decoder;

sending a command signal from said integrated receiver/decoder to a selector switch;

acquiring and locking said IRD to the satellite signal; and resending said command signal from said integrated receiver/decoder to said selector switch once said integrated receiver/decoder has acquired and locked onto said satellite signal.

2. A method of selecting a satellite signal comprising the steps of:

selecting said satellite signal via an integrated receiver/decoder (IRO);

sending a first command signal from said IRD to a selector switch;

switching in response to said first command signal, said selector switch to couple to a low noise block converter (LNB) corresponding to said first command signal;

acquiring and locking said IRD to the satellite signal;

sending a second command signal from said integrated receiver/decoder to said selector switch;

receiving and locking onto said selected satellite signal in the instance where said selector switch is coupled to said LNB corresponding to the first command signal; and disregarding said second command signal.

3. The method of claim 2, further comprising the step of:

receiving and locking onto a non-selected satellite signal in the instance where said selector switch is coupled to said LNB not corresponding to the first command signal.

4. The method of claim 3, further comprising the steps of:

switching to said low noise block converter (LNB) corresponding to said second command signal; and acquiring and locking the IRD to the satellite signal in response to said second command signal.

5. The method of claim 4, further comprising the steps of:

sending a third command signal from said integrated receiver/decoder to said selector switch;

receiving and locking onto said selected satellite signal in the instance where said selector switch is coupled to said LNB corresponding to the second command signal; and disregarding said third command signal.

6. Apparatus for selecting a satellite signal comprising:

means for selecting said satellite signal via an integrated receiver/decoder (IRD);

means for sending a first command signal from said IRD to a selector switch;

means for switching in response to said first command signal, said selector switch to couple to a low noise block converter (LNB) corresponding to said first command signal;

means for acquiring and locking said IRD to the satellite signal;

means for sending a second command signal from said integrated receiver/decoder to said selector switch;

means for receiving and locking onto said selected satellite signal in the instance where said selector switch is coupled to said LNB corresponding to the first command signal; and means for disregarding said second command signal.

7. The apparatus of claim 6, further comprising:

means for receiving and locking onto a non-selected satellite signal in the instance where said selector switch is coupled to said LNB hot corresponding to the first command signal.

8. The apparatus of claim 7, further comprising:

means for switching to said low noise block converter (LNB) corresponding to said second command signal; and means for acquiring and locking the IRD to the satellite signal in response to said second command signal.

9. The apparatus of claim 8, further comprising:

means for sending a third command signal from said integrated receiver/decoder to said selector switch;

means for receiving and locking onto said selected satellite signal in the instance where said selector switch is coupled to said LNB corresponding to the second command signal; and means for disregarding said third command signal.

10. The method of claim 2, further comprising the steps of:

terminating said satellite signal currently being received by an integrated receiver/decoder (IRD);

repeatedly sending at least one of said first command signal and second signal from said IRD to said selector switch; and receiving and locking onto said selected satellite signal in the instance where a selector switch is coupled to said LNB corresponding to at least one of said first command signal and second command signal.

11. The method of claim 10, comprising the step of:

searching for said terminated satellite signal via said repeated command signals, after said selector switch terminated said currently received satellite signal.

12. The apparatus of claim 7, further comprising:

means for terminating said satellite signal currently being received by said integrated receive/decoder (IRD);

means for repeatedly sending said at least one of said first command signal and said second command signal from said IRD to said selector switch; and means for receiving and locking onto said selected satellite signal in the instance where a selector switch is coupled to said LNB corresponding to at least one of said first command signal and second command signal.

13. The apparatus of claim 12, comprising:

means for searching for said terminated satellite signal via said repeated command signals, after said selector switch terminated said currently received satellite signal.

* * * * *